United States Patent Office 3,476,722
Patented Nov. 4, 1969

3,476,722
PROCESS FOR POLYMERIZING ACRYLIC ACID ESTERS
Robert K. Schlatzer, Chagrin Falls, Ohio, assignor to The B. F. Goodrich Company, New York, N.Y., a corporation of New York
No Drawing. Filed Aug. 15, 1966, Ser. No. 572,186
Int. Cl. C08f *15/16, 1/28*
U.S. Cl. 260—86.1          7 Claims

ABSTRACT OF THE DISCLOSURE

Sulfur-curable rubbery homopolymers and copolymers of acrylic esters are obtained by polymerization of the acrylate monomers with a tertiary amine-modified organoaluminum catalyst. Copolymers of alkenyl esters of acrylic acid such as allyl acrylate or crotyl acrylate are obtained by the present process.

---

This invention relates to a new process for polymerizing esters of acrylic acid and more particularly this invention relates to a process for copolymerizing acrylate esters with an organoaluminum catalyst modified with a tertiary amine to form sulfur-curable rubbery homopolymers and interpolymers and the resulting polymers.

Sulfur-curable acrylate polymers are of interest to the industry and are potentially useful in a variety of applications. Acrylate copolymers containing glycidyl acrylate, certain halogen containing monomers, and the like, and capable of being cured in sulfur recipes are known. However, the rate of cure as well as the ultimate physical properties of these polymers is not completely satisfactory. Another approach to the problem of producing sulfur-curable acrylate polymers is to introduce unsaturation into the polymer backbone to provide sulfur cure sites. Attempts to prepare such unsaturated acrylate copolymers by free radical polymerization techniques and using various conjugated and non-conjugated monomers has met with only limited success. The polymers prepared in this manner generally have poor heat and oil resistance as well as other deficiencies.

It is therefore an object of this invention to provide a new and useful process for polymerizing esters of acrylic acids. It is a further object of this invention to provide a process for copolymerizing alkyl and alkenyl esters of acrylic acid to produce sulfur-curable acrylate polymers which in the vulcanized state have improved oil and heat resistance. Still another object of the present invention is to provide new and useful sulfur-curable acrylate polymers by this polymerization process.

The above objects are accomplished in accordance with the process of this invention by homopolymerizing or interpolymerizing acrylate esters at low temperatures with a catalyst prepared by mixing an organoaluminum compound with a tertiary amine. Since efforts to utilize anionic polymerization methods for the preparation of unsaturated acrylate polymers have not been satisfactory or the products obtained had low molecular weights or such high degrees of crystallinity as to make them non-useable, it was completely unexpected to find that alkyl and alkenyl esters for acrylic acid could be anionically polymerized by using an organoaluminum catalyst modified with a tertiary amine. It was even more surprising that the resulting polymers were high molecular weight and upon sulfur curing had very useful properties.

A preferred polymerization process is to contact an alkenyl ester of acrylic acid such as allyl acrylate or crotyl acrylate with another acrylate ester such as ethyl acrylate with a catalyst prepared by mixing triisobutylaluminum with triethylamine such that the molar ratio of triethylamine to triisobutylaluminum is from about 0.5 to about 10 at a temperature of about $-100°$ C. to about $-50°$ C. and autogenous pressure.

The esters of acrylic acid employed in the process of this invention are represented by the formula

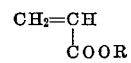

wherein R represents an alkyl radical having from 1 to 8 carbon atoms such as methyl, ethyl, propyl, isopropyl, n-butyl nad the like with methyl acrylate and ethyl acrylate being especially preferred, or an alkenyl radical having from 3 to 6 carbon atoms with R=3 (allyl radical) and R=4 (crotyl radical) being especially preferred. The acrylate esters can be homopolymerized or they can be interpolymerized.

The polymerization process is conducted using a catalyst comprising an organoaluminum compound which has been reacted with a tertiary amine. Suitable organoaluminum compounds include those having the formula

wherein R is a hydrocarbon radical having from 2 to 8 carbon atoms and $x$ is a number from 0 to 2, such as triethylaluminum, tributylaluminum, triisobutylaluminum, triisoprenylaluminum, triphenylaluminum, diethylaluminum hydride, diisobutylaluminum hydride and the like. The basic nitrogen compounds which may be reacted in accordance with this invention are tertiary amines having the formula

where $R_1$, $R_2$ and $R_3$ are alkyl groups, either the same or different, containing from 1 to 8 carbon atoms, such as trimethylamine, triethylamine, tri-n-propylamine, tri-isopropylamine, tri-n-butylamine, tri-isobutylamine, tri-n-amylamine, tri-isoamylamine, tri-n-hexylamine and the like.

The mol ratio of tertiary amine compound to alkyl aluminum compound ranges preferably from about 0.1 to about 100 and more preferably from about 0.5 to about 10. It is possible to conduct the polymerization with triethylamine as the solvent medium, however, catalyst efficiencies are quite low. At very low ratios of tertiary amine to alkyl aluminum compound, the catalyst efficiency decreases markedly and also the polymer obtained has very low molecular weight. The amount of catalyst required to polymerize the acrylate esters will generally vary within the range from about 0.05 millimol to about 40 millimol organoaluminum compound based on 100 millimol acrylate monomers and depending on the monomer and solvent purity, the reactivity of the monomers, etc. Preferably the catalyst concentration will range from about 0.2 millimol to about 1.2 millimol organoaluminum compound per hundred millimol of monomer.

The polymerization is preferably conducted in the presence of an inert diluent. The most useful inert diluents include aromatic hydrocarbon solvents such as toluene, ethyl benzene, xylene and the like, with toluene being especially preferred for solution polymerizations since high yields of high molecular weight polymers are obtained. Also, the resulting polymerization cements are smooth and free of cross-linked polymer when toluene is used as the solvent. The aromatic solvents useful for the polymerization will be limited by their freezing points. Aliphatic solvents, especially hexane and heptane may also be employed for the polymerization and are especially useful where it is desirable to precipitate the polymer throughout the polymerization run. It may also be advantageous to use a mixture of aromatic and aliphatic solvents.

It is not necessary that the acrylate monomers and solvent be absolutely pure. However, a reasonable purity will insure a smooth polymeriation as well as decrease the amount of catalyst required. Steps should be taken to eliminate or keep at as low a level as possible contaminants such as water, oxygen, carbon dioxide, alcohols and the like. For this reason it is generally desirable that the monomers and solvent be distilled and/or passed through a molecular seive prior to use and that the polymerization be conducted in an inert atmosphere such as nitrogen.

The catalyst is normally prepared by reacting the organoaluminum compound and the tertiary amine in the polymerization solvent. Generally, the amine is added to the organoaluminum compound which is already in solution. This addition is normally carried out at room temperature. If the amount of catalyst to be prepared is large it may be advantageous to conduct the addition at lower temperature. The catalyst preparation will normally be made prior to the polymerization run, however, the catalyst may be prepared in situ by the addition of one of the catalyst components to the other in the presence of the acrylate monomers. The catalyst, if prepared prior to the polymerization may be added incrementally or continuously throughout the run, or it may be added all at one time. In conducting the polymerization, it may be carried out as either a batch or continuous process and the monomers and/or catalyst may be added by any of the conventional techniques.

The polymerization process may be effectively carried out over wide ranges of temperatures and pressures. Usually polymerization temperatures will range from about $-150°$ C. to about $50°$ C. and more preferably within the range of from about $-100°$ C. to about $-50°$ C. The polymerization will most conveniently be conducted at autogenous pressure or moderate pressures ranging to about 1 atmosphere, but the presusre may be varied from subatmospheric up to about 10 or more atmospheres. It is particularly convenient to conduct the polymerization process of this invention at autogenous pressure and at a temperature of about $-70°$ C. to about $-90°$ C. The time required for the polymerization will, of course, vary with the temperature and pressure. Suitable conversions are usually achieved in 24 hours or less.

Acrylate esters employed in this invention may be homopolymerized or they may be interpolymerized. Homopolymers of alkyl esters of acrylic acid having useful molecular weights are obtained in high yields. They generally have a dilute solution viscosity (DSV) greater than about 0.3 and more generally they range between 0.5 and 2.5 with little or no gel formation. Poly(ethyl acrylate), a particularly useful homopolymer obtained by the process of this invention, is obtained with little or no crosslinking and as a soft, elastomeric material.

The poly(ethyl acrylate) is readily soluble and useful for the manufacture of leather and paper, special finishes, textile sizing, pressure-sensitive adhesives, bases, etc.

Interpolymers capable of being cured in a sulfur recipe are particulariy useful as specialty rubbers and are an especially important aspect of this invention. By copolymerizing a small amount of an alkenyl ester of acrylic acid with an alkyl ester of acrylic acid polymers having a good balance of physical properties upon sulfur curing are obtained. The most useful interpolymers include those which contain an alkyl acrylate in the amounts generally greater than about 80% by weight and more usually within the range of about 90 to about 98% by weight, and less than about 20% by weight and more preferably from about 2 to about 10% by weight of an alkenyl acrylate capable of introducing cure sites (unsaturation) into the polymer. Especially useful are ethyl acrylate-allyl acrylate copolymers and ethyl acrylate-crotyl acrylate copolymers. These copolymers have superior properties when compared with free-radical polymerized alkyl acrylate-alkenyl acrylate copolymers, with the added features the copolymers are obtained in yields upwards of 90% and are essentially free of gel.

The acrylate copolymers are not limited to sulfur cures, other vulcanizing agents are equally effective and may be useful in certain applications. These include: compounds which thermally decompose at vulcanization temperature to yield free radicals such as organic peroxides, diazoaminobenzenes and the like; compounds that produce free radicals upon oxidation such as phenols, aromatic amines, mercaptans and the like with certain oxidizing agents; and oxidants such as polynitrobenzenes, quinones, quinone oximes and the like.

No special processing is required for the acrylate copolymers, conventional processing techniques are used. Compounding ingredients are readily incorporated into the acrylates as is, in solvents, masterbatched with other compounding ingredients and the like by mixing on a rubber mill or in an internal mixer in solutions or dispensions of the rubber. Conventional fillers, reinforcing agents, extenders, curing agents, accelerators, and the like, are compatible with rubbery acrylate copolymers.

The following examples serve to illustrate the invention more fully, however, they are not intended to limit the scope thereof. All parts and percentages are by weight unless otherwise indicated.

Examples 1–12

These examples demonstarte the variation in polymer molecular weight and polymerization rate when the polymerization temperature and the catalyst composition are varied for ethyl acrylate polymerization. A series of catalyst solutions were prepared by adding under an atmosphere of dry nitrogen the triethylamine (TEA) to a solution of triisobutylaluminum (TIBA) in dried toluene. The catalyst solutions were then charged to dry nitrogen-filled polymerization vessels maintained at the desired polymerization temperature and containing toluene and ethyl acrylate which had been previously passed through a 4A molecular sieve.

Temperatures were maintained throughout the polymerizations through the use of an external heat exchange media. At the completion of the run Examples 1–6 were shortstopped by the addition of about 5 ml. of ethanol while about 20 ml. of a solution containing equal volumes of ethanol and acetyl actone was used as shortstop in Examples 7–12. The poly(ethyl acrylate) was recovered from the polymerization cements by precipitation with heptane. The polymers were washed several times with heptane before drying in a vacuum oven.

Data for Examples 1–12 are shown in Table I set forth below. DVS's were obtained on solutions containing 0.2 gram of polymer per 100 ml. toluene containing 3% by volume acetyl acetone. There was no visible gel in solutions of the polymers.

TABLE I

| | TIBA Molarity | TEA:TIBA Mol Ratio | Parts | Parts Toluene | Parts Ethyl Acrylate | Polymerization Temp., °C. | Polymerization Time (hrs.) | Percent Polymer Yield | DSV |
|---|---|---|---|---|---|---|---|---|---|
| Example No.: | | | | | | | | | |
| 1 | 0.5 | 0.41 | 3.36 | 26.47 | 28.92 | 30 | 23.5 | 81.4 | 0.523 |
| 2 | 0.5 | 4.0 | 4.04 | 43.03 | 14.04 | 35 | 66 | 69 | (1) |
| 3 | 0.5 | 0.41 | 1.83 | 25.97 | 28.77 | 5 | 44 | 80.5 | 0.741 |
| 4 | 0.5 | 0.41 | 3.35 | 51.54 | 28.82 | 5 | 44 | 84.8 | 0.522 |
| 5 | 0.5 | 0.41 | 1.74 | 24.75 | 28.45 | −20 | 24 | 85.2 | 1.118 |
| 6 | 0.5 | 0.41 | 0.86 | 42.95 | 14.04 | −86 | 24 | 93.8 | 2.158 |
| 7 | .481 | 0.932 | 0.92 | 43.00 | 14.05 | −86 | 5 | 93.4 | 1.505 |
| 8 | 0.469 | 1.58 | 0.80 | 43.06 | 14.09 | −86 | 5 | 94.1 | 1.652 |
| 9 | 0.492 | 3.99 | 0.80 | 43.59 | 14.21 | −86 | 5 | 94.4 | 1.637 |
| 10 | 0.523 | 5.69 | 0.88 | 42.89 | 14.30 | −86 | 5 | 94.6 | 1.592 |
| 11 | 0.503 | 7.83 | 0.83 | 42.75 | 14.00 | −86 | 5 | 94.2 | 1.648 |
| 12 | 0.503 | 9.78 | 0.77 | 43.05 | 14.30 | −86 | 5 | 92.2 | 1.719 |

[1] A sticky viscous liquid.

The polymerizations conducted at −86° C. and with catalysts having TEA:TIBA ratios greater than about 1 (Examples 7–12) proceeded smoothly and in less than 5 hours had achieved conversions of 90% or more. The polymers had high molecular weights as evidenced by their DSV's and snappy character. It is evident from the examples that at higher polymerization temperatures the molecular weights of the polymers formed are below the acceptable range for the majority of applications. Also it should be noted that although high molecular weight polymer can be produced at low TEA:TIBA mol ratios, the polymerization rates are slower. Example 6, for example, run at −86° C. with 0.41 TEA:TIBA, was sampled after 4.5 hours and shown to contain 1.64% total solids with 6.47% conversion of the ethyl acrylate.

Example 13

To demonstrate the ability to conduct polymerizations in the presence of larger amounts of triethylamine, 13.60 parts ethyl acrylate, 21.49 parts triethylamine and 17.27 parts toluene were placed in a polymerization vessel maintained at −86° C. and contacted with 5.91 parts of a catalyst 0.5 M in triisobutylaluminum and having a mol ratio of TEA:TIBA of 3.0. As the polymerization commenced, the polymer precipitated. The polymerization was shortstopped after about 30 hours with 20 ml of an ethanol-acetyl acetone solution (1:1 by volume) and the poly(ethyl acrylate) collected by filtration. Polymer having a DSV of 0.829 was obtained in 84% yield.

Example 14

N-butyl acrylate was similarly homopolymerized with a catalyst 0.474 M in triisobutylaluminum and having a mol ratio of TEA:TIBA of 3.14. The catalyst solution (0.88 part) was injected into the polymerization vessel charged with 43.5 parts sieved toluene and 13.95 parts sieved n-butyl acrylate and maintained at −86° C. After 16.5 hours the polymerization cement was shortstopped by the addition of 20 ml. of an ethanolacetyl acetone solution (1:1 by volume). Poly(n-butyl acrylate) was recovered by heptane precipitation in 89% yield and had a DSV of 1.56 with no visible gel.

Examples 15–18

In each of these examples ethyl acrylate was copolymerized with an alkenyl ester of acrylic acid to form sulfur curable acrylate copolymers. Each polymerization vessel was dried, thoroughly flushed with nitrogen, cooled to about −86° C. and charged with 172 parts sieved toluene and an amount of the esters of acrylic acid. The triisobutylaluminum-triethylamine catalyst solution was then injected into the polymerization vessel. Polymerization was immediately evident. Shortstopping agents were injected into the polymerization cement at the completion of the run. About 80 ml. of an ethanol-acetylacetone solution (1:1 by volume) was used in Examples 15–17, while the polymerization of Example 18 was quenched with about 40 ml. of ethanol. The polymer products were isolated by precipitation with heptane, followed by heptane washes and drying in a vacuum oven. Polymerization details for the examples are set forth in Table II. The data includes the triisobutylaluminum molarity, the TEA:TIBA mol ratio, parts of catalyst and monomers charged, reaction time, percent polymer yield, and the DSV and iodine number of the polymer obtained.

The polymers were compounded by standard mill mixing techniques in the following recipes:

| | A | B |
|---|---|---|
| Polymer | 100 | 104 |
| Carbon black | 50 | 50 |
| Stearic acid | 1 | 2 |
| Zinc oxide | 5 | 17 |
| 2,2'-dithiobis(benzothiazole) | 1 | 4 |
| Tetramethylthiuram monosulfide | 2 | 2 |
| Sulfur | 2 | 8 |

TABLE II

| | Example | | | |
|---|---|---|---|---|
| | 15 | 16 | 17 | 18 |
| Catalyst: | | | | |
| Molarity triisobutylaluminum | 0.492 | 0.492 | 0.492 | 0.5 |
| TEA:TIBA mol ratio | 3.99 | 3.99 | 3.99 | 0.41 |
| Catalyst charged (parts) | 2.9 | 3.8 | 4.6 | 3.4 |
| Ethyl acrylate charged (parts) | 57.12 | 57.16 | 57.22 | 56.89 |
| Allyl acrylate charged (parts) | 0.93 | 1.92 | 2.87 | |
| Crotyl acrylate charged (parts) | | | | 2.83 |
| Reaction time (hours) | 17 | 19 | 22 | 20 |
| Percent polymer yield | 97.2 | 96.7 | 96.3 | 90.0 |
| DSV | 1.551 | 1.384 | 1.155 | 2.084 |
| Iodine number | 3.4 | 6.6 | 9.6 | 9.5 |

The compounded polymers were milled into 6" x 6" x 0.025" sheets and press cured at 305° F. for 10 minutes. Physical test data was obtained for the sulfur vulcanized acrylate copolymers and are set forth in Table III.

TABLE III

| Compound recipe | Example 15 A | Example 16 A | Example 17 A | Example 18 B |
|---|---|---|---|---|
| Original properties: | | | | |
| 100% modulus (p.s.i.) | 305 | 480 | 650 | 710 |
| 300% modulus (p.s.i.) | 580 | 1,150 | | 2,150 |
| Ultimate properties [1] | Yielded/380/63 | 1,210/360/68 | 960/200/71 | 2,150/300/80 |
| Properties after tempering 3 hours at 350° F.: | | | | |
| 100% modulus (p.s.i.) | 380 | 550 | 640 | 770 |
| 300% modulus (p.s.i.) | | | | 1,670 |
| Ultimate properties [1] | 505/270/68 | 960/290/74 | 830/170/73 | 1,670/300/85 |
| Properties after air-aging 2 days at 350° F.: | | | | |
| 100% modulus (p.s.i.) | 610 | 1,020 | | 1,510 |
| 300% modulus (p.s.i.) | | | | |
| Ultimate properties [1] | Yielded/210/75 | 1,350/160/80 | 1,300/80/84 | 2,040/210/97 |
| Properties after aging in ASTM #3 oil (70 hrs. at 300° F.): | | | | |
| 100% modulus (p.s.i.) | 200 | 405 | 600 | |
| 300% modulus (p.s.i.) | | 700 | | |
| Ultimate properties [1] | Yielded/301/50 | Yielded/310/59 | 750/170/62 | |
| Gehman freeze point (° C.) | −70 | −16 | −16 | −15 |
| Compression set (70 hours at 300° F.) | | 81.6 | 84.3 | 76.6 |

[1] Tensile strength (p.s.i.)/elongation percent/Durometer A hardness.

After immersion in ASTM #3 oil for 70 hours at 300°., the polymer of Example 16 had a 100% modulus of 405 p.s.i., a 300% modulus of 700 p.s.i., a Durometer A hardness of 59 and yielded at 310% elongation.

It is evident from the above Examples that the catalyst of this invention can be used to prepare unsaturated acrylate copolymers which are capable of being cured in sulfur recipes to give highly useful elastomers. The cured elastomers are useful in a variety of applications where solvent resistance is essential, such as seals, gaskets and the like.

I claim:
1. A process for producing acrylate polymers comprising polymerizing acrylate esters having the formula

$$\begin{array}{c} CH_2=CH \\ | \\ COOR \end{array}$$

where R represents an alkyl radical having from 1 to 8 carbon atoms or an alkenyl radical having from 3 to 6 carbon atoms at a temperature between about −150° C. and 50° C. in the presence of a catalyst formed by reacting (a) an organoaluminum compound having the formula $$R_{3-x}AlH_x$$

wherein R is a hydrocarbon radical having from 2 to 8 carbon atoms and $x$ is a number from 0 to 2, and the amount of said organoaluminum compound employed ranges between about 0.05 millimol and 40 millimols per hundred millimols of the acrylate ester monomer, and (b) a tertiary amine having the formula $$\begin{array}{c} R_1 \quad R_2 \\ \diagdown \diagup \\ N \\ | \\ R_3 \end{array}$$

where $R_1$, $R_2$ and $R_3$ are alkyl groups containing from 1 to 8 carbon atoms such that the molar ratio of the nitrogen-containing compound to the organoaluminum compound is between about 0.1 and about 100.

2. The process of claim 1 wherein the molar ratio of the tertiary amine compound to the organoaluminum compound is between about 0.5 and about 10.

3. The process of claim 2 wherein the temperature is maintained between about −100° C. and about −50° C.

4. The process of claim 3 wherein the polymerization is conducted in a hydrocarbon solvent.

5. The process of claim 4 wherein the acrylate esters are ethyl acrylate and allyl acrylate.

6. The process of claim 4 wherein the acrylate esters are ethyl acrylate and crotyl acrylate.

7. The process of claim 4 wherein the nitrogen-containing compound is triethylamine and the organoaluminum compound is a trialkyl aluminum.

References Cited

UNITED STATES PATENTS

| 2,320,536 | 6/1943 | Pollack et al. | 260—86.1 |
| 2,478,416 | 8/1949 | Miller | 260—89.5 |
| 2,744,886 | 5/1956 | Protzman. | |
| 2,987,500 | 6/1961 | Rossetti | 260—89.5 |
| 3,094,513 | 6/1963 | Kropa. | |
| 3,069,403 | 12/1962 | Prapas | 260—89.5 |
| 3,198,772 | 8/1965 | Chadha | 260—86.1 |
| 3,287,334 | 11/1966 | Kropa. | |

HARRY WONG, Jr., Primary Examiner

U.S. Cl. X.R.

260—41, 79.5, 89.1, 89.5

PO-1050
(5/69)

UNITED STATES PATENT OFFICE
CERTIFICATE OF CORRECTION

Patent No. 3,476,722      Dated November 4, 1969

Inventor(s) Robert K. Schlatzer

It is certified that error appears in the above-identified patent and that said Letters Patent are hereby corrected as shown below:

Column 2, line 20, "nad" should read ---and---.

Column 3, line 40, "temperature" should read ---temperatures--- line 58, "presusre" should read ---pressure---.

Column 4, line 41, "pensions" should read ---persions---.

Column 6, line 48, "104" should read ---100---; line 51, "17" should read ---10---; line 52, "4" should read ---2---; line 53, "2" should read ---4---; line 54, "8" should read ---4---; line 65, "20" should read ---24---; line 66, "90.0" should read ---90.7---; line 67, "2.084" should read ---2.088---.

Column 7, Table III, under Example 15A, "Yielded/301/50" should read ---Yielded/310/50---; Table III, under Example 15A, "-70" should read --- -17 ---; line 21, "300°" should read ---300°F.---.

SIGNED AND
SEALED
MAY 26 1970

(SEAL)
Attest:

Edward M. Fletcher, Jr.
Attesting Officer

WILLIAM E. SCHUYLER, JR.
Commissioner of Patents